(12) United States Patent
Zhang et al.

(10) Patent No.: US 10,646,006 B2
(45) Date of Patent: May 12, 2020

(54) COVER ATTACHMENT STRUCTURE AND METHOD

(71) Applicant: YKK Corporation, Tokyo (JP)

(72) Inventors: Wanli Zhang, Kurobe (JP); Yuko Fukuda, Kurobe (JP); Hikaru Okuyama, Kurobe (JP)

(73) Assignee: YKK Corporation (JP)

( * ) Notice: Subject to any disclaimer, the term of this patent is extended or adjusted under 35 U.S.C. 154(b) by 65 days.

(21) Appl. No.: 15/779,945

(22) PCT Filed: Dec. 2, 2015

(86) PCT No.: PCT/JP2015/083940
§ 371 (c)(1),
(2) Date: May 30, 2018

(87) PCT Pub. No.: WO2017/094155
PCT Pub. Date: Jun. 8, 2017

(65) Prior Publication Data
US 2018/0325224 A1  Nov. 15, 2018

(51) Int. Cl.
*A44B 19/34* (2006.01)
*A44B 19/08* (2006.01)
(Continued)

(52) U.S. Cl.
CPC ............ *A44B 19/34* (2013.01); *A44B 19/08* (2013.01); *A44B 19/12* (2013.01); *B62D 1/06* (2013.01)

(58) Field of Classification Search
CPC ......... A44B 19/08; A44B 19/12; A44B 19/34; B62D 1/06
See application file for complete search history.

(56) References Cited

U.S. PATENT DOCUMENTS 3,750,260 A * 8/1973 Jakob .................. B29D 5/06
                                                        29/408
4,042,735 A    8/1977 Yoneya
(Continued)

FOREIGN PATENT DOCUMENTS

JP        S5247424       10/1977
JP        S5563605        5/1980
(Continued)

OTHER PUBLICATIONS

Zhang, Wanli; International Preliminary Report on Patentability for PCT Application No. PCT/JP2015/083940, filed Dec. 2, 2015, dated Jun. 5, 2018, 10 pgs.
(Continued)

*Primary Examiner* — Robert Sandy
*Assistant Examiner* — David M Upchurch
(74) *Attorney, Agent, or Firm* — Taylor English Duma LLP

(57) ABSTRACT

A cover attachment structure includes a sheet-shaped cover member, a base, and a fastener member. The fastener member includes a first element row and a second element row. The base has a recessed groove extending along a surface thereof. Fastener elements of the first element row and the second element row are received in the recessed groove and locked in the recessed groove in a state in which engaging head portions of the fastener elements engage with each other. The recessed groove is configured such that a minimum groove width thereof in a width direction orthogonal to a length direction of the recessed groove is less than 2 times a length, in the width direction, of either one of the fastener elements received in the recessed groove.

15 Claims, 17 Drawing Sheets

(51) Int. Cl.
*A44B 19/12* (2006.01)
*B62D 1/06* (2006.01)

(56) References Cited

U.S. PATENT DOCUMENTS

| | | |
|---|---|---|
| 4,290,194 A | 9/1981 | Takahashi |
| 2012/0167355 A1 | 7/2012 | Takano et al. |

FOREIGN PATENT DOCUMENTS

| | | |
|---|---|---|
| JP | S6153269 | 4/1986 |
| JP | H04215562 | 8/1992 |
| JP | 2000053000 | 2/2000 |
| WO | 2011030442 | 3/2011 |

OTHER PUBLICATIONS

Zhang, Wanli; International Search Report for PCT Application No. PCT/JP2015/083940, filed Feb. 12, 2015, dated Feb. 23, 2016, 5 pgs.

\* cited by examiner

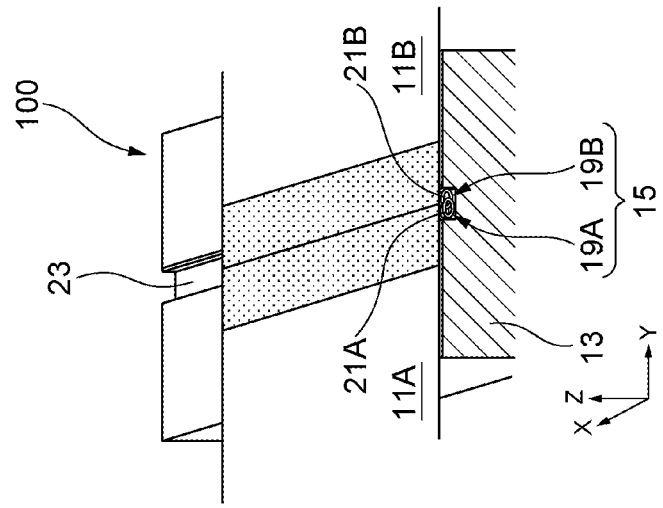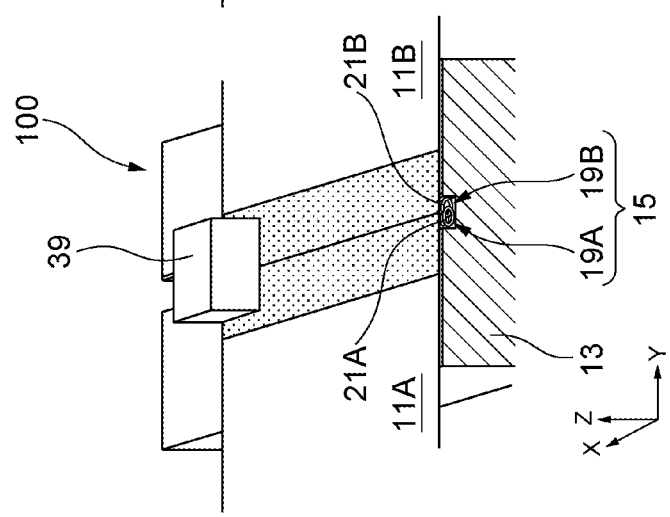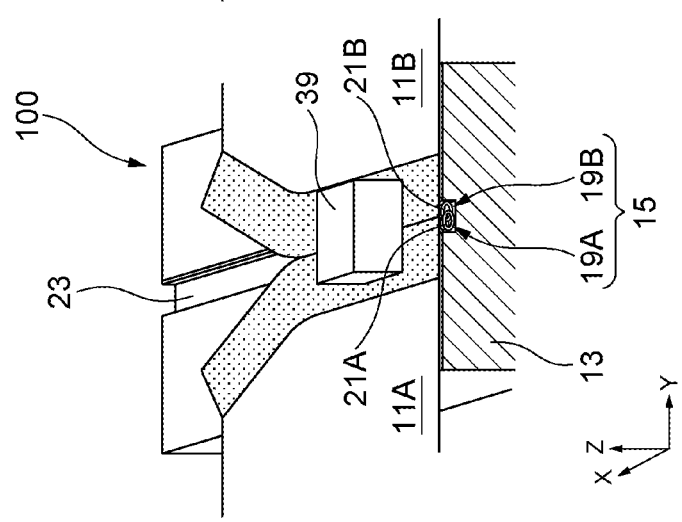

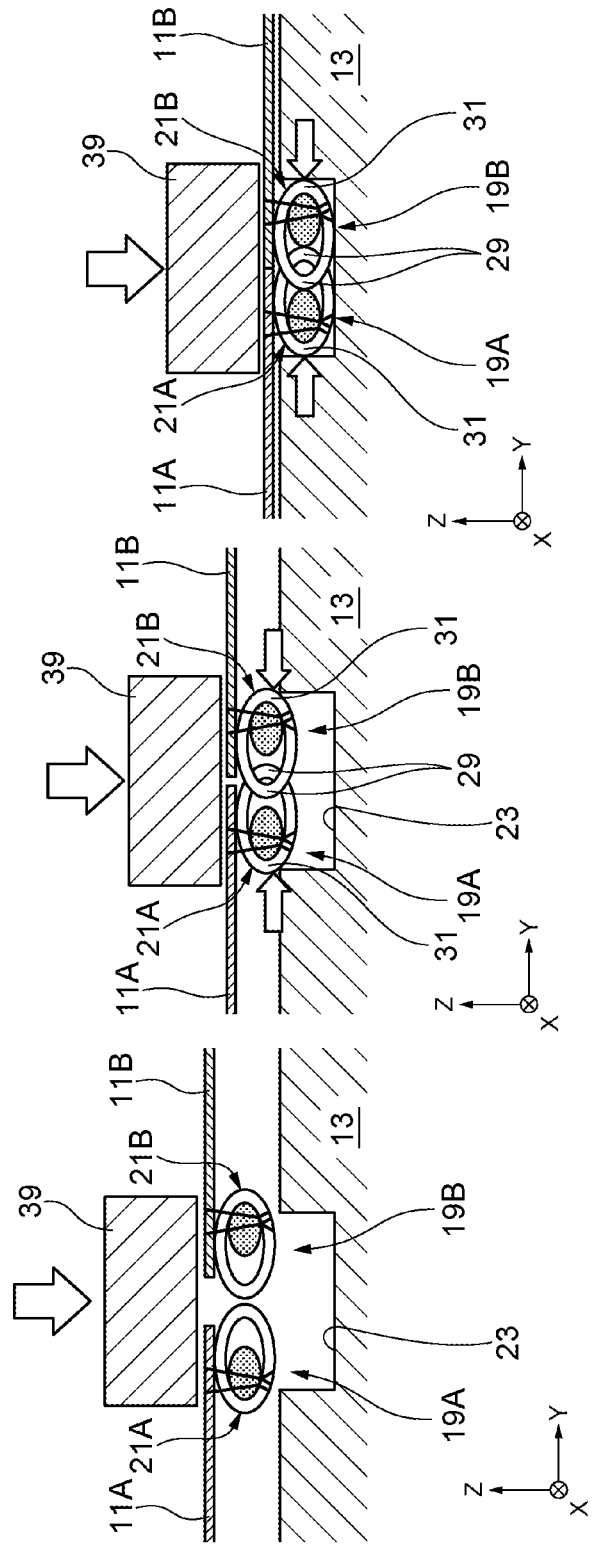

COVER ATTACHMENT STRUCTURE AND METHOD

TECHNICAL FIELD

The present invention relates to a cover attachment structure with a cover member attached to a surface of a base and also to a cover attachment method for the cover attachment structure.

BACKGROUND ART

In general, articles are known, in which a cover member is attached to a site thereof, where scratches or abrasions are likely to occur on a base surface thereof due to contact or rubbing with other members, thereby imparting a surface protection or antifouling function thereto. Also, there is a case where a desired cover member is attached for decoration to a site, where an aesthetic appearance of a base surface thereof is required, or a cover member attached to a base is replaced for renewing. An example of such cover members is a steering cover (cover member) made of natural leather, artificial leather or the like and attached to a steering wheel of an automobile (see Patent Documents 1 and 2).

PRIOR ART DOCUMENT

Patent Document

Patent Document 1: Japanese Patent Application Publication No. 2000-53000A
Patent Document 2: Japanese Utility Model Applications Publication No. S61-053269U

SUMMARY OF INVENTION

Problems to Be Solved by Invention

In a cover attachment structure of Patent Document 1, an end portion of a cover member is inserted into a recessed groove previously formed in a base and then the end portion is bonded in the recessed groove. However, in this configuration, a process of bonding the cover member is complex and also requires a long processing time until the cover member is completely fixed. In addition, once the cover member is attached to the base, the cover member cannot be removed from the base. Therefore, there is a disadvantage that the cover member cannot be cleaned or replaced.

On the other hand, in a configuration of Patent Document 2, a fastener with slider is provided on an end portion of a cover member, thereby allowing the cover member to be easily removably attached to a base. That is, the cover member is fixed to the base by winding the cover member around the base and then joining end portions of the cover member with each other by the fastener with slider. Thus, a surface of the base is simply covered with the cover member.

However, in a case where a cover member is attached to a base using a fastener as in the configuration of Patent Document 2, as shown in FIG. 17A, fastener elements 215 are exposed on a cover member 213 covering a base 211 and thus form a projection 217. Also, as shown in FIG. 17B, even if the cover member 213 is turned upside down, the projection 217 is also formed by the fastener elements 215. Since the projection 217 causes a foreign matter feeling when touched by hand or a poor exterior appearance, it is preferable that the projection 217 is not formed. Thus, as shown in FIG. 17C, it is conceived that fastener elements 215 are received in a recessed groove 219 previously formed in a base 211 in order not to protrude to the outside of the base.

However, a gap, which is intended to allow the slider to pass therethrough, needs to be provided around the fastener elements 215 received in the recessed groove 219. Therefore, the recessed groove 219 is formed as a wider and deep-bottomed groove, in which an extra gap space for allowing the slider to pass therethrough is formed around the fastener elements 215. In such a wider and deep-bottomed recessed groove 219, it is difficult to lock the fastener elements 215 of the cover member 213 in position. Also, since the fastener elements 215 are relatively smaller than the recessed groove 219, the cover member 213 is likely to be laterally displaced.

The present invention has been made keeping in mind the above problems, and an object thereof is to provide a cover attachment structure and a cover attachment method for the cover attachment structure, in which a cover member can be simply attached to a surface of a base and also firmly fixed to the base without causing a poor exterior appearance or foreign matter feeling due to using a fastener member.

Means for Solving Problems

The present invention includes the following configurations.

(1) A cover attachment structure, including sheet-shaped cover member, a base having a surface to be covered with the cover member, and a fastener member for attaching the cover member to the base,
wherein the fastener member includes:
a first element row provided on one end portion of the cover member and including a plurality of fastener elements each having an engaging head portion and arranged along an end edge of the one end portion; and
a second element row including a plurality of fastener elements each having an engaging head portion capable of engaging with the fastener elements of the first element row,
wherein the base has a recessed groove extending along the surface thereof,
wherein the fastener elements of the first element row and the second element row are received in the recessed groove and locked in the recessed groove in a state where the engaging head portions thereof engage with each other, and
wherein the recessed groove is configured such that a minimum groove width thereof in a width direction orthogonal to a length direction of the recessed groove is less than 2 times a length, in the width direction, of either one of the fastener elements received in the recessed groove.

(2) The cover attachment structure according to (1), wherein the minimum groove width is 1.6 or more times the length, in the width direction, of one of the fastener elements.

(3) The cover attachment structure according to (1) or (2), wherein the recessed groove is configured such that a maximum groove width dimension thereof located more toward a bottom surface thereof than is the minimum groove width is 1.6 or more times and 2.5 or less times the length, in the width direction, of either one of the fastener elements received in the recessed groove.

(4) The cover attachment structure according to any one of (1) to (3), wherein the recessed groove has a groove depth of 0.5 or more times and 1.5 or less times a height of the fastener elements.

(5) The cover attachment structure according to any one of (1) to (4), wherein the fastener elements of the first element row is provided on a fastener tape, wherein the fastener tape is attached to the one end portion of the cover member.

(6) The cover attachment structure according to (5), wherein the fastener elements of the second element row is provided on a fastener tape, wherein the fastener tape is attached to the one end portion of the cover member.

(7) The cover attachment structure according to any one of (1) to (3), wherein the fastener elements of the first element row is directly attached to the one end portion of the cover member.

(8) The cover attachment structure according to (7), wherein the fastener elements of the second element row is directly attached to the one end portion of the cover member.

(9) The cover attachment structure according to any one of (1) to (8), wherein the second element row is provided on an end portion of the cover member located at a location different from that of the one end portion of the cover member, on which the first element row is provided.

(10) The cover attachment structure according to (9), wherein the cover member is arranged to encircle an outer circumference of the base, wherein the second element row is provided on the other end portion thereof opposite to the one end portion, wherein the fastener elements of the first element row and the second element row are locked in the recessed groove.

(11) The cover attachment structure according to any one of (1) to (10),
wherein the cover member comprises a plurality of cover members,
wherein the base has recessed grooves formed to correspond to fastener elements of the plurality of cover members, and
wherein fastener elements of different cover members are received in the recessed grooves at the same location.

(12) The cover attachment structure according to any one of (1) to (11), wherein the recessed groove is configured to have an inclined surface formed on at least one of opposing groove side surfaces in such a manner that a groove width in the width direction is narrowed from an opened end portion thereof toward a groove bottom surface.

(13) The cover attachment structure according to any one of (1) to (12), wherein the recessed groove has a groove bottom surface wider than the minimum groove width.

(14) The cover attachment structure according to any one of (1) to (13),
wherein the base is a steering wheel for an automobile, and
wherein the cover member is a steering cover for covering the outside of the steering wheel.

(15) A cover attachment method for the cover attachment structure according to (1) to (12), including:
a first step of causing a part of the fastener elements of the first element row and a part of the fastener elements of the second element row to be received in one part of the recessed groove in the length direction in a state the engaging head portions thereof are engaged with each other; and
a second step of pressing the cover member toward the recessed groove while moving from the one part of the recessed groove in the length direction as a starting point along an extending direction of the recessed groove, so that the remaining unengaged fastener elements are received in the recessed groove in a state where engaging head portions thereof are engaged with each other, thereby locking the fastener elements of the first element row and the second element row in the recessed groove.

(16) The cover attachment method according to the above (15), wherein in the second step, a pressing roller rotatably supported is moved along the extending direction of the recessed groove while being pressed toward the recessed groove from above the fastener member, and also the pressing roller is rolled on the fastener member.

Advantageous Effects of Invention

According to the present invention, the cover member can cover the surface of the base without causing a poor exterior appearance or foreign matter feeling due to using the fastener member, and also the cover member can be firmly fixed to the base without being displaced relative to the base.

BRIEF DESCRIPTION OF DRAWINGS

FIGS. 4A, 4B and 4C are process diagrams showing one aspect of a procedure of attaching the cover members to the base.

FIGS. 7A, 7B and 7C are diagrams showing in a stepwise manner an operation in which fastener elements are inserted into the recessed groove.

EMBODIMENTS OF INVENTION

Hereinafter, embodiments of the present invention will be described in detail with reference to the accompanying drawings.

<Basic Configuration of Cover Attachment Structure>

First, a basic configuration of a cover attachment structure according to the present invention will be described.

Figure 1:
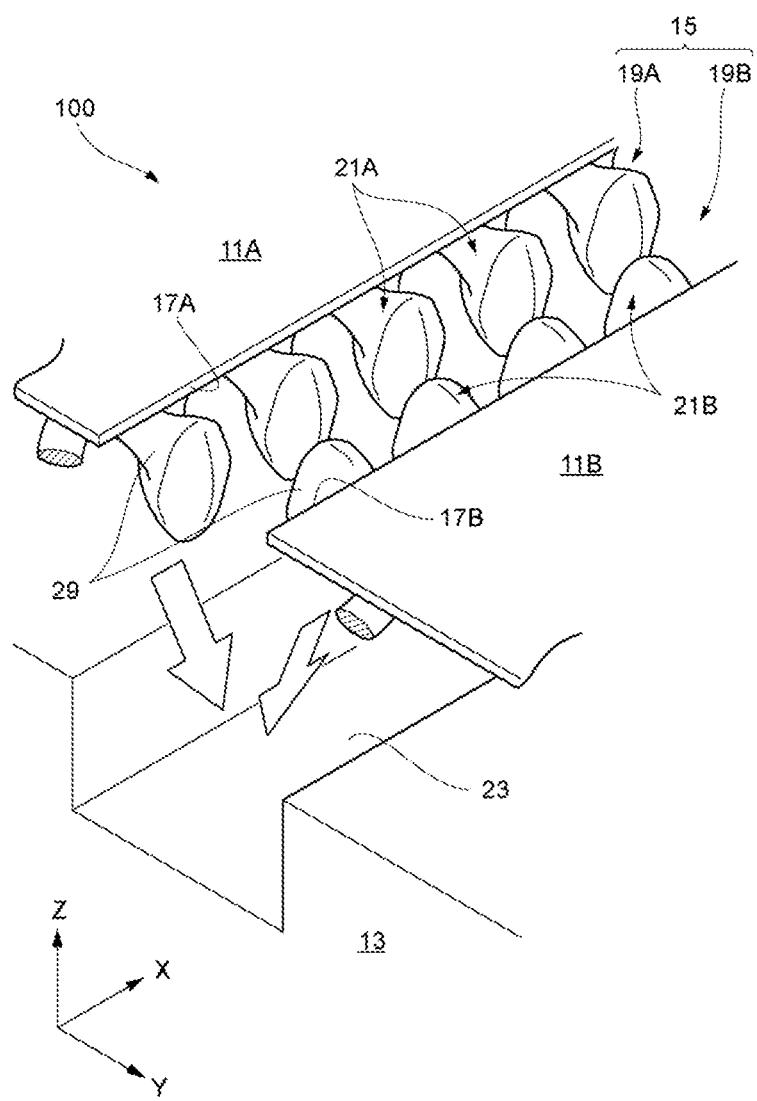
FIG. 1 is an exploded perspective view of a cover attachment structure.
Figure 2:
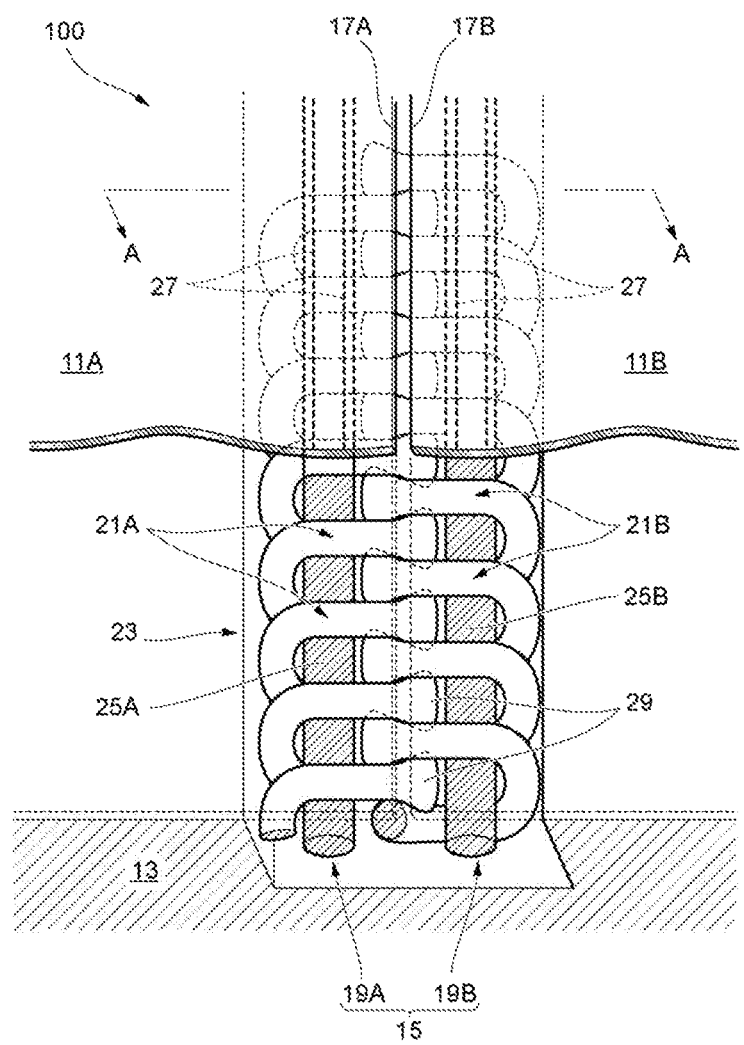
FIG. 2 is a partially sectional perspective view obtained by partially cutting cover members of the cover attachment structure, showing a state where fastener elements are received in a recessed groove.
Figure 3:
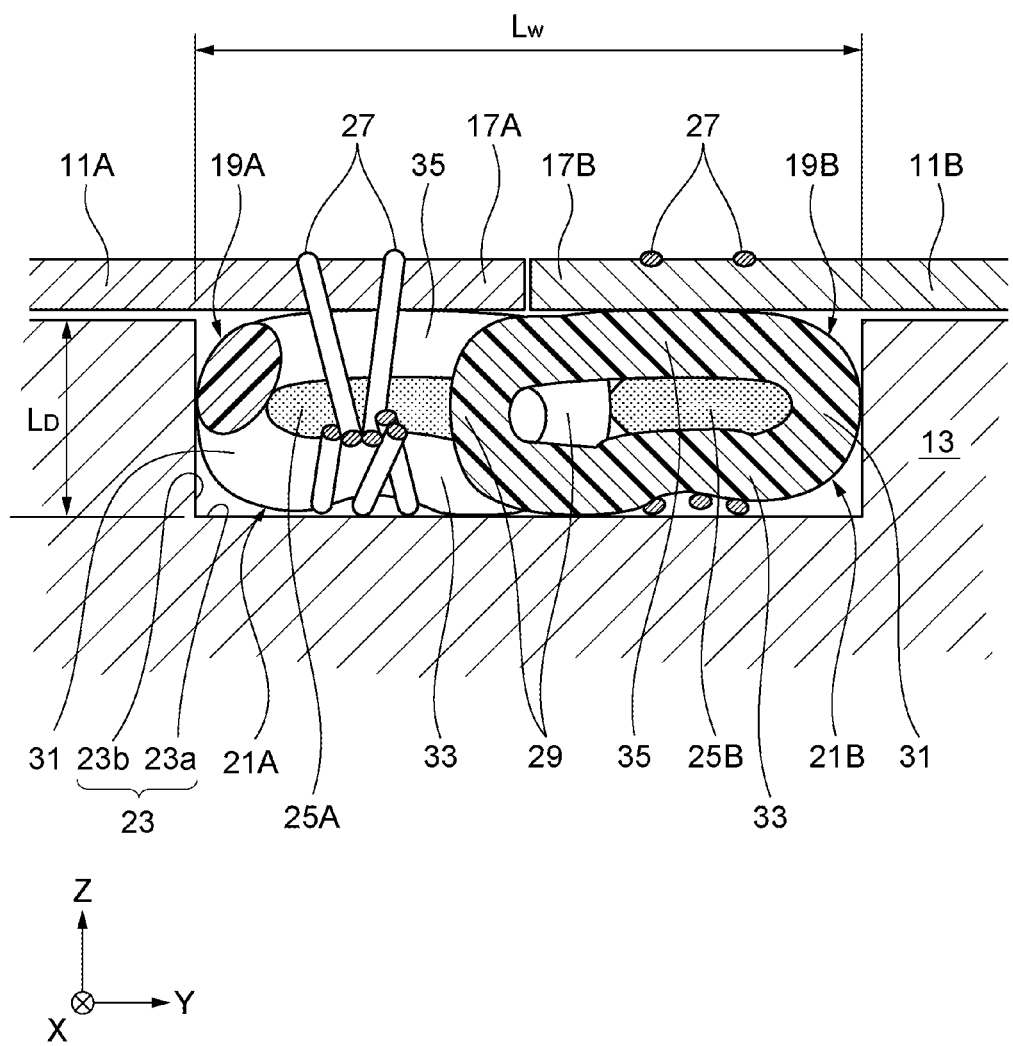
FIG. 3 is a sectional view taken along a line A-A in FIG. 2.

FIG. 1 is an exploded perspective view of the cover attachment structure, FIG. 2 is a partially sectional perspective view obtained by partially cutting cover members of the cover attachment structure, showing a state where fastener elements are received in a recessed groove, and FIG. 3 is a sectional view taken along a line A-A in FIG. 2.

As shown in FIG. 1, the cover attachment structure 100 has sheet-shaped cover members 11A, 11B, a base 13 having a surface to be covered with the cover members 11A, 11B, and a fastener member 15 for attaching the cover members 11A, 11B to the base 13. In the present configuration, fastener elements for a coil-shaped fastener are used as the fastener member 15.

The base 13 is made of synthetic resin, metal, wood or the like and preferably has a hardness of the extent that inconvenience in operation of engaging a slide fastener is not caused.

The fastener member 15 has a first element row 19A provided on one end portion 17A of the cover member 11A and a second element row 19B provided on one end portion 17B of the cover member 11B. The first element row 19A is provided along an end edge of the one end portion 17A of the cover member 11A, and the second element row 19B is provided along an end edge of the one end portion 17B of the cover member 11B. Each of the first element row 19A and the second element row 19B has a plurality of fastener elements 21A, 21B, respectively. That is, according to the embodiment disclosed in FIG. 1, the fastener elements 21A, 21B are directly fixed on the cover member 11A, 11B, respectively, without using fastener tapes as described below.

The base 13 has a recessed groove 23 extending along a surface thereof. The recessed groove 23 in the shown example is a linear groove and has at least a bottom surface and a pair of side surfaces rising from both ends of the bottom surface. Also, the recessed groove 23 is formed in a rectangular shape as viewed in a sectional view taken perpendicularly to a length direction thereof. As shown in FIG. 2, the first element row 19A and the second element row 19B provided on the cover members 11A, 11B are inserted in the recessed groove 23. Thus, the fastener member 15 is locked in the recessed groove 23 and the cover members 11A, 11B are attached to a surface of the base 13.

Herein, the length direction of the recessed groove 23 is referred to as an X direction, a depth (height) direction of the recessed groove 23 is referred to as a Z direction, and a direction orthogonal to the X direction and the Z direction is referred to as Y direction. A Y-direction length of the recessed groove 23 is simply referred to as a "groove width". Meanwhile, for the fastener member 15, even if the fastener elements 21A, 21B are not received in the recessed groove 23, an extending direction of the fastener elements 21A, 21B can be referred to as the X direction, based on a state where the fastener elements 21A, 21B are received in the recessed groove 23.

The first element row 19A and the second element row 19B are coil-shaped continuous elements formed in a coil shape by coiling a mono filament made of synthetic resin, such as polyamide or polyester, and also provided with a wider engaging head portion by pressing parts of elements at predetermined intervals by stamping at the same time as when molded into the coil shape. The coil-shaped continuous elements are respectively attached to the one end portion 17A, 17B of each of the cover members 11A, 11B, which become an element attaching portion, and as a result, the cover members 11A, 11B are integrally provided with the first element row 19A and the second element row 19B, respectively.

More specifically, as shown in FIG. 3, the first element row 19A and the second element row 19B have core strings 25A, 25B respectively inserted in the coil-shaped continuous elements and also are respectively sewn on the cover members 11A, 11B by a fixing thread 27. Sewing is performed by, for example, a two-needle three-thread double chain stitch, using the fixing thread 27.

Each of the coil-shaped continuous elements is configured to have a plurality of engaging head portions, but herein, each of the engaging head portions is defined as constituting one fastener element 21A (and 21B). Thus, it is assumed that each of the coil-shaped continuous elements is constituted of a plurality of fastener elements 21A (and 21B) and one engaging head portion is formed on each of the fastener elements 21A (and 21B). But, the element to be employed in the present invention is not limited to the coil-shaped continuous element, and thus for example, a resin fastener in which a plurality of independent elements is intermittently integrally injection-molded along a fastener tape may be employed. Also, a metal fastener in which a plurality of independent elements are intermittently crimped and fixed along a fastener tape may be employed.

The fastener element 21A (and 21B) has an engaging head portion 29 formed on one end thereof in the Y direction and a turn portion 31 formed on the other end and is formed in the coil shape by connecting the engaging head portion 29 with the turn portion 31 by an upper leg 33 and a lower leg 35. The fastener elements 21A of the first element row 19A and the fastener elements 21B of the second element row 19B have the same shape and are arranged to be inverted to each other, and also are configured such that the engaging head portions 29 thereof are engaged with each other while alternately overlapping with each other.

<Cover Attachment Method for Cover Attachment Structure>

Next, a procedure of attaching the cover members 11A, 11B of the cover attachment structure 100 will be described.

FIGS. 4A, 4B and 4C are process diagrams showing one aspect of the procedure of attaching the cover members 11A, 11B to the base 13.

In the cover attachment structure 100 of the present configuration, the cover members 11A, 11B are connected with each other via the fastener member 15, and the engaged fastener elements 21 of the fastener member 15 are received in the recessed groove 23 of the base 13. Thus, the cover members 11A, 11B are attached to the base 13.

When the fastener member 15 is inserted into the recessed groove 23, as shown in FIG. 4A, the fastener elements 21A, 21B on one part of the fastener member 15 in a length direction thereof (one end portion in the length direction in the shown example) are first inserted into the recessed groove 23. That is, a part of fastener elements 21A of the first element row 19A and a part of fastener elements 21B of the second element row 19B are inserted into the recessed groove 23 in a state where engaging head portions thereof are engaged with each other. At this time, inserting the fastener elements 21A, 21B into the recessed groove 23 may be performed by pressing a pressing member 39 from above the fastener member 15 toward the recessed groove 23 or may be performed by pressing the fastener member 15 by hand (first step).

Then, the pressing member 39 arranged on the fastener member 15 (on a surface thereof opposite to the recessed groove 23) is moved along an extending direction of the recessed groove while being pressed toward the recessed groove 23. Then, as shown in FIG. 4B, the fastener elements 21A, 21B of the first element row 19A and the second element row 19B are sequentially received in the recessed groove 23 (second step).

The pressing member 39 is retracted after the fastener elements 21A, 21B are inserted in the recessed groove 23 (see FIG. 4C), thereby obtaining the cover attachment structure 100 with the cover members 11A, 11B attached to the base 13.

Next, how the fastener elements 21A, 21B are received in the recessed groove 23 and the cover members 11A, 11B are locked in the recessed groove 23 will be described in more detail with reference to FIGS. 5 to 7C.

Figure 5:
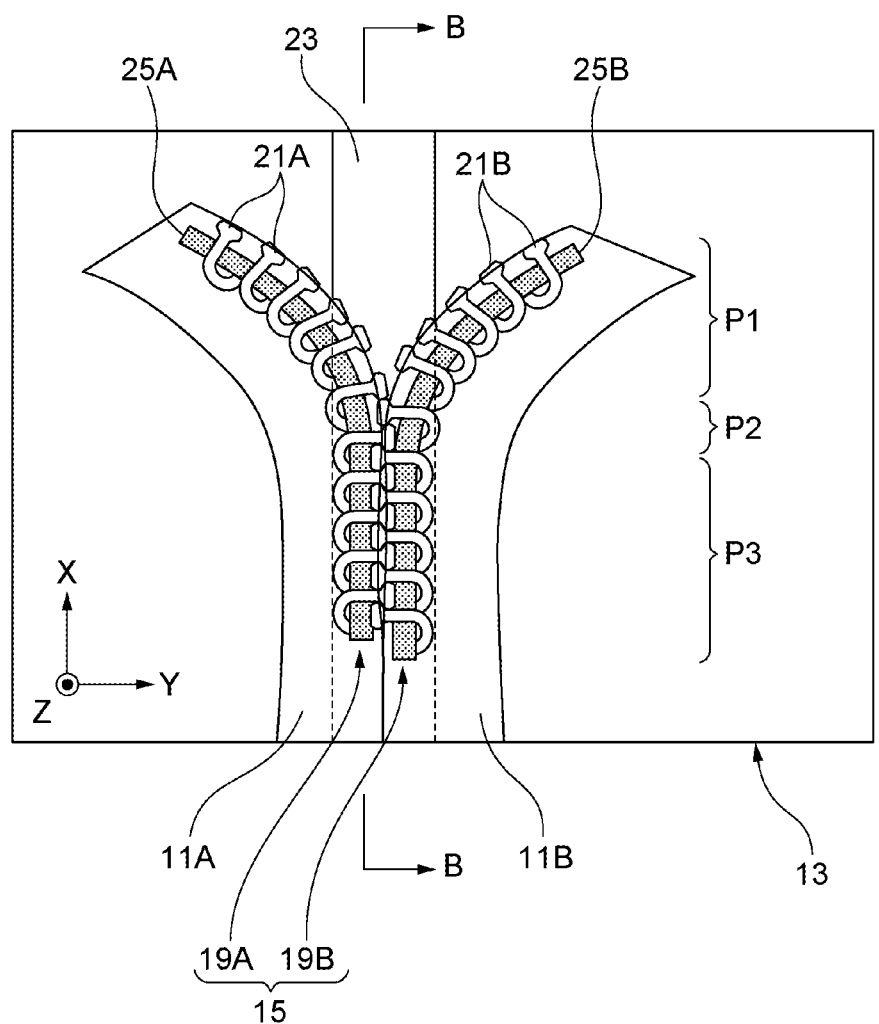
FIG. 5 is a diagram schematically showing how fastener elements of a first element row of a cover member and a second element row of another cover member are inserted into the recessed groove.
Figure 6:
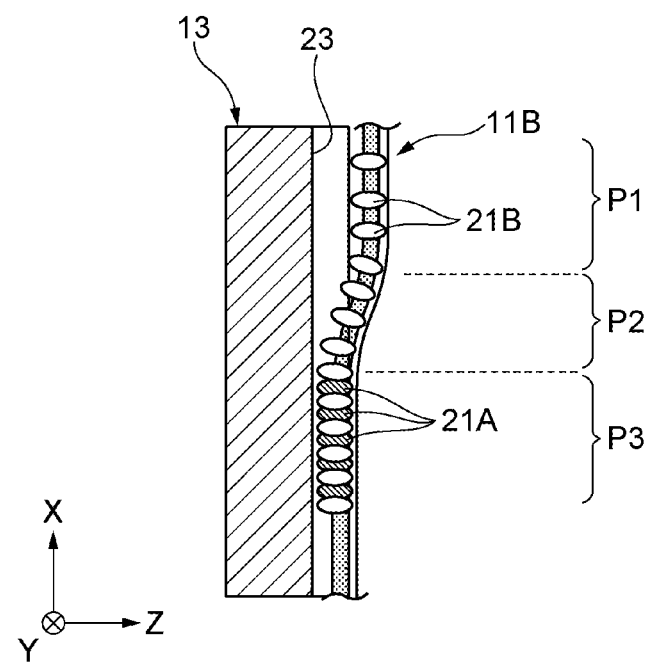
FIG. 6 is a sectional view as viewed in an arrow direction from a line B-B in FIG. 5.

FIG. 5 is a diagram showing how the fastener elements 21A, 21B of the first element row 19A of the cover member 11A and the second element row 19B of the cover member 11B are inserted into the recessed groove 23. Also, FIG. 6 is a sectional view as viewed in an arrow direction from a line B-B in FIG. 5. Reference numerals P1 to P3 shown in FIGS. 5 and 6 indicate regions in which an engaged state of the first element row 19A and the second element row 19B and an inserted state thereof in the recessed groove 23 are shown in a stepwise manner. P1 indicates a step in which they are not engaged with each other and also not inserted in the recessed groove 23; P2 indicates a step in which they start to be engaged with each other and are being inserted into the recessed groove 23; and P3 indicates a step in which they have been engaged with each other and also inserted in the recessed groove 23. Meanwhile, end portions of the cover members 11A, 11B in the shown example may be end portions of one sheet of a cover member or may be end portions of separate cover members.

FIGS. 7A, 7B and 7C are diagrams showing in a stepwise manner an operation in which the fastener elements 21A, 21B are inserted into the recessed groove 23.

In the step P1, as shown in FIG. 7A, the fastener elements 21A, 21B of the first element row 19A and the second element row 19B attached to the cover members 11A, 11B are arranged above the recessed groove 23 and are pressed toward the recessed groove 23 by the pressing member 39.

In the step P2, as shown in FIG. 7B, a part of each of the fastener elements 21A, 21B is about to be inserted into the recessed groove 23 due to pressing by the pressing member 39. At this time, the turn portions 31 of the fastener elements 21A, 21B are pressed against side surfaces of the recessed groove 23. Then, the fastener elements 21A, 21B approach each other in a direction narrowing a distance therebetween, and thus the engaging head portions 29 thereof start to engage with each other. Further, the cover members 11A, 11B also approach each other together with the fastener elements 21A, 21B, so that a gap between end edges of the cover members 11A, 11B is narrowed.

Then, in the step P3, as shown in FIG. 7C, the fastener elements 21A, 21B are further pushed into the recessed groove 23 due to pressing by the pressing member 39, so that the engaging head portions 29 of the fastener elements 21A, 21B engage with each other. Also, the entire thickness of the fastener elements 21A, 21B is received in the recessed groove 23. At this time, the cover members 11A, 11B are close to or abut against each other, thereby covering the base 13 substantially without a gap therebetween.

According to the cover attachment structure 100 as described above, the cover members 11A, 11B can be simply attached to a surface of the base 13 only by inserting the fastener elements 21A, 21B attached to the end portions of the cover members 11A, 11B into the recessed groove 23 of the base 13. If the fastener elements 21A, 21B are received in the recessed groove 23 in a state where the engaging head portions 29 thereof engage with each other, it is not easy for the fastener elements 21A, 21B to escape out of the recessed groove 23 due to a frictional resistance thereto and the like. That is, the fastener elements 21A, 21B are preferably mounted in the recessed groove 23 in an interference-fitted state. In order to make the fastener elements 21A, 21B into such an interference-fitted state, a dimension of the recessed groove 23 needs to be set to correspond to a size of the fastener elements 21A, 21B.

<Dimensional Relationship Between Recessed Groove and Fastener Elements>

Next, a dimensional relationship between the recessed groove 23 and the fastener elements 21A, 21B will be described.

Figure 8A:
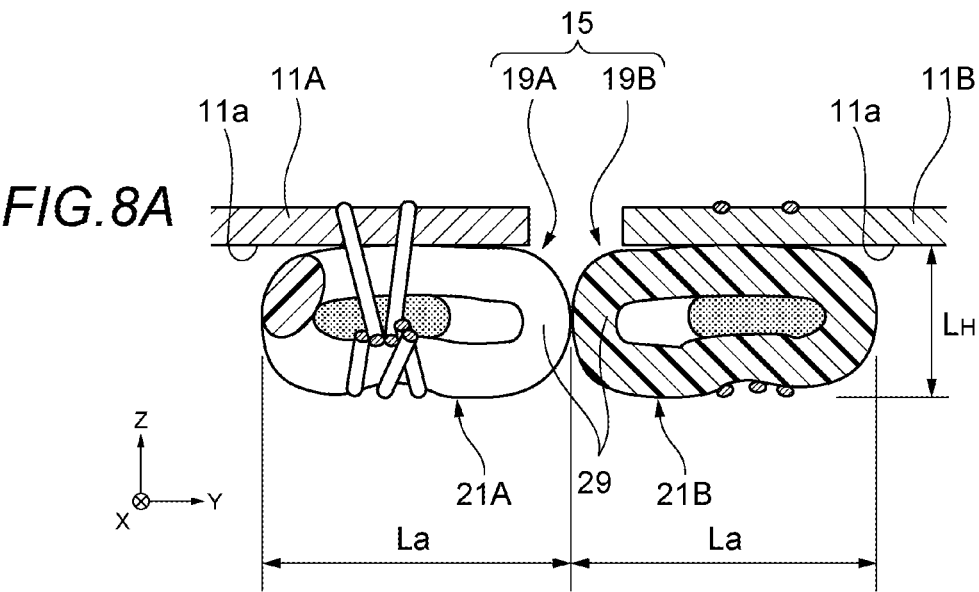
FIG. 8A is a sectional view showing a state of fastener elements attached to one end portion of each of the cover members before engaging with each other.
Figure 8B:
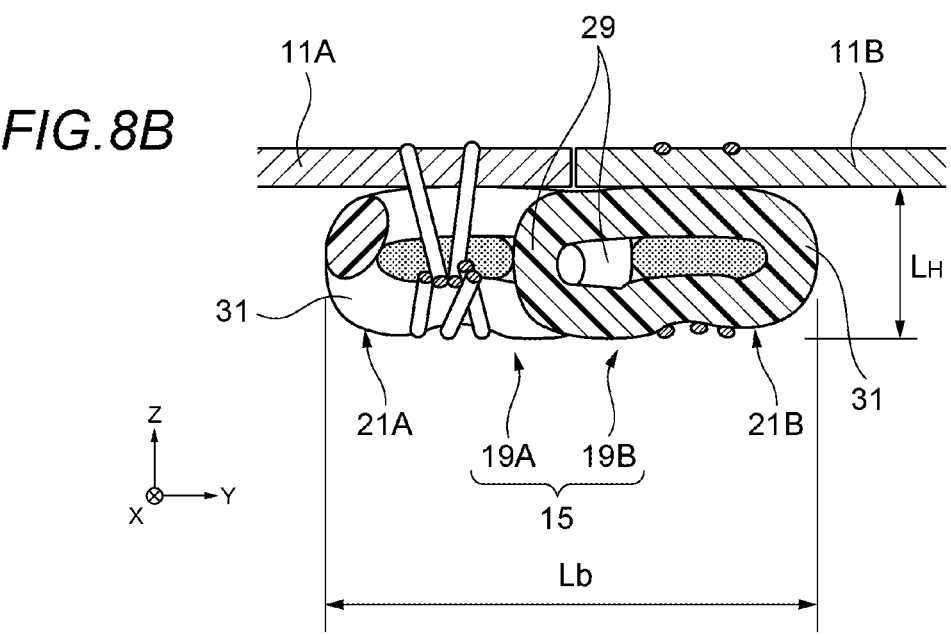
FIG. 8B is a sectional view showing a state of the fastener elements after engaging with each other.

FIG. 8A is a sectional view showing a state of the fastener elements 21A, 21B attached to one end portion of each of the cover members 11A, 11B before being engaging with each other, and FIG. 8B is a sectional view showing a state of the fastener elements 21A, 21B after engaging with each other. As shown in the figures, a maximum width of each of the fastener elements 21A, 21B in a width direction (Y direction) orthogonal to the extending direction (X direction perpendicular to the paper plane) of the first element row 19A and the second element row 19B is referred to La, and a maximum height (Z-direction height) of the fastener member 15 from attaching surfaces 11a of the cover members 11A, 11B is referred to as LH.

Also, in a state where the engaging head portions 29 of the fastener elements 21A, 21B engage with each other as shown in FIG. 8B (and also a state where no load is exerted on the fastener elements 21A, 21B), the total width of the fastener elements 21A, 21B in the width direction (Y direction) is referred to as Lb. The total width Lb of the fastener elements 21A, 21B is 1.7 to 1.9 times the maximum width La of one fastener element 21A (or 21B). Also, in a case where the fastener elements 21A, 21B are compressed in the width direction to the maximum extent within a range of elastic deformation thereof, the total width Lb is about 1.6 times the maximum width La.

As shown in FIG. 3, the recessed groove 23 has a shape recessed in a depth direction and has the bottom surface 23a and the pair of side surfaces 23b rising from the bottom surface 23a. Upper sides of the side surfaces 23b define boundary lines to the upper surface of the base 13. Also, although not shown, the base 13 may have front and rear surfaces provided on both end sides of the recessed groove 23 in the extending direction, depending on applications thereof. The front and rear surfaces rise from the bottom surface 23a and also are arranged between the pair of side surfaces 23b. When the recessed groove 23 is represented by dimensions of the fastener elements 21A, 21B, a dimension (minimum groove width Lw) between side surfaces of the recessed groove 23 having a minimum width in a width direction thereof (Y direction) is 1.6 or more times and less than 2 times the maximum width La of one fastener element 21A (or 21B). If the minimum groove width Lw is less than 1.6 times, the fastener elements 21A, 21B are plastically deformed when inserted into the recessed groove 23, thereby causing the fastener elements 21A, 21B to be damaged. On the other hand, if the minimum groove width Lw is 2 or more times, the engaging head portions 29 of the fastener elements 21A, 21B are likely to be disengaged from each other, and in this case, the cover members 11A, 11B cannot be fixed in the recessed groove 23. Meanwhile, the term "1.6 times", which is a minimum value of the minimum groove width Lw, is intended to numerically represent a case where the fastener elements 21A, 21B in a state where the fastener elements engage with each other are compressed in the width direction to the maximum extent within a range of elastic deformation thereof. Thus, in other words, the minimum value of the minimum groove width Lw can be also defined as "a dimension to the extent of allowing the fastener elements 21A, 21B to be inserted and received in the recessed portion in an engaged state."

On the other hand, the term "less than 2 times", which is a maximum value of the minimum groove width Lw, means the lowest value, above which the fastener elements 21A, 21B in a state where the fastener elements are disengaged from each other are not in an interference-fitted state. Thus, in other words, the maximum value of the minimum groove width Lw can be also defined as "the lowest dimension allowing the fastener elements 21A, 21B to be in an interference-fitted state."

Also, a dimension (groove depth LD) of the recessed groove 23 from the outer surface of the base to the bottom surface thereof preferably is 0.5 or more times and 1.5 or less times the maximum height LH of the fastener elements 21A, 21B. If the groove depth LD of the recessed groove 23 is less than 0.5 times, the fastener elements 21A, 21B are likely not to be locked in the recessed groove 23. On the other hand, if the groove depth LD is more than 1.5 times, a value by which the fastener elements 21A, 21B are sunken is increased, thereby sometimes causing a poor exterior appearance due to sagging of the cover members 11A, 11B or a foreign matter feeling when pressed from the outside.

<Groove Cross-Sectional Shape of Recessed Groove>

FIGS. 9A to 9D are sectional views showing various groove cross-sectional shapes of the recessed groove 23. Meanwhile, for convenience of explanation, common parts will be described using the same reference numerals.

Figure 9A:
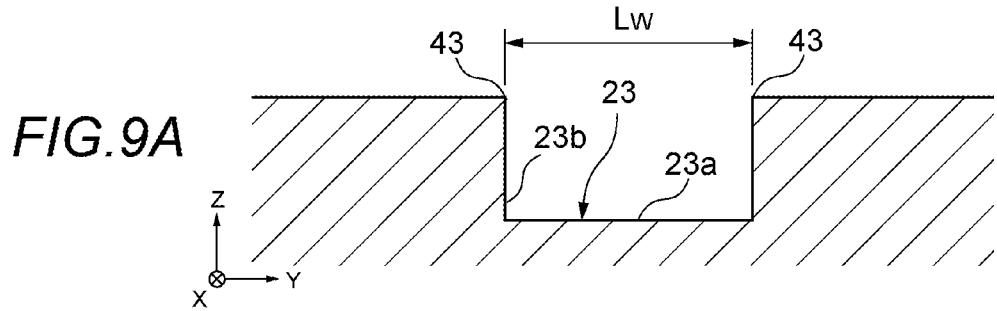
FIG. 9A is a sectional view of a rectangular cross-sectional-shaped recessed groove.

The recessed groove 23 is not limited to a rectangular cross-sectional-shaped groove described above, in which the pair of side surfaces 23b is flat and extends parallel to each other as shown in FIG. 9A. On the side surfaces 23b, inclined surfaces may be respectively formed in such a manner that a groove width is narrowed from an opened end portion 43 toward the bottom surface 23a.

Figure 9B:
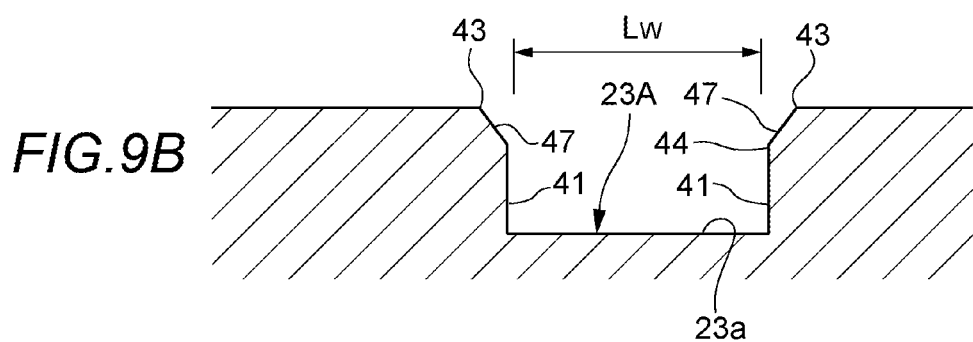
FIG. 9B is a sectional view of a recessed groove having inclined surfaces formed on groove side surfaces thereof in such a manner that a groove width is narrowed from an opened end portion thereof toward a groove bottom surface.

For example, like a recessed groove 23A shown in FIG. 9B, a recessed groove may be employed, which has a bottom surface 23a and a pair of groove side surfaces 41 extending in a vertical direction (Z direction) from the bottom surface 23a to be parallel to each other and in which a first inclined surface 47 is formed on the groove side surfaces 41 in such a manner that a groove width is narrowed from an opened end portion 43 toward the bottom surface 23a.

The first inclined surface 47 may be formed on either of the pair of groove side surfaces 41 opposing each other, instead of being formed on both. In this case, the first inclined surface 47 serves as a guide when the fastener elements 21A, 21B are inserted into the groove. Thus, the fastener elements 21A, 21B can be smoothly guided into the recessed groove 23.

Meanwhile, in the case of the configuration shown in FIG. 9B, the minimum groove width Lw is a dimension between lower ends of a pair of first inclined surfaces 47 (between the pair of groove side surfaces 41 extending parallel to each other).

Further, the recessed groove may have a groove bottom surface 45 wider than the minimum groove width Lw at an opened end portion 43. For example, like a recessed groove 23B shown in FIG. 9C, a trapezoidal cross-sectional-shaped recessed groove 23B may be employed, in which a pair of side surfaces is formed as second inclined surfaces 48 having a distance therebetween gradually widened from the opened end portion 43 toward the groove bottom surface 45 and a groove width LB of the groove bottom surface 45 is wider than the minimum groove width Lw. That is, the groove bottom surface 45 has a maximum groove width in such a manner that the maximum groove width is located more toward the bottom surface than is the minimum groove width Lw. In this case, a vertical direction (Z direction) range having the minimum groove width Lw is narrowed, thereby reducing a insertion resistance of the fastener elements 21A, 21B to the recessed groove 23.

Figure 9C:
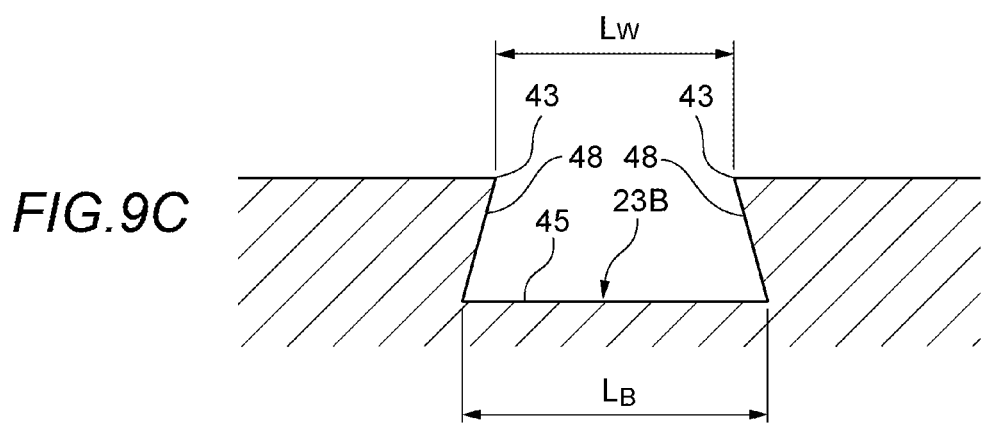
FIG. 9C is a sectional view of a recessed groove having a groove bottom surface wider than a minimum groove width at an opened end portion.

Alternatively, the second inclined surfaces 48 of the exemplary configuration shown in FIG. 9C may not be configured to continuously extend to the groove bottom surface 45, but a pair of side surfaces extending parallel to each other may be arranged between lower ends of the second inclined surfaces 48 and the groove bottom surface 45.

Figure 9D:
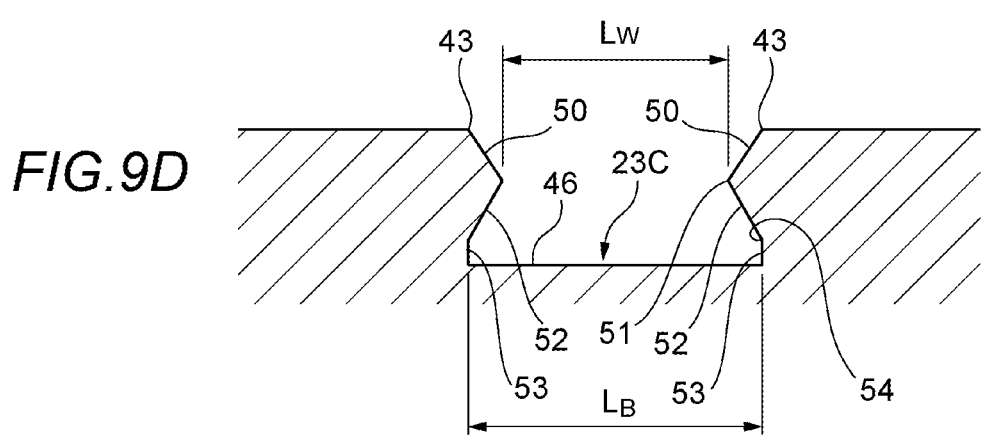
FIG. 9D is a sectional view of a recessed groove configured such that groove side surfaces have inclined surfaces formed from an opened end portion thereof and inclined surfaces having a groove width widened from a middle of a groove depth toward a groove bottom surface.

Further, each of the groove side surfaces of the recessed groove may have a plurality of inclined surfaces formed from the opened end portion 43 toward the bottom surface 23a (45). For example, as shown in FIG. 9D, a recessed groove may be employed, which has third inclined surfaces 50 formed from an opened end portion 43 and fourth inclined surfaces 52 having a groove width widened from a middle of a groove depth toward a groove bottom surface 46. This recessed groove 23C is configured such that the third inclined surfaces 50 extend from the opened end portion 43 to protrusions 51 at upper ends of the fourth inclined surfaces 52 and the fourth inclined surfaces 52 extend from lower ends of the third inclined surfaces 50 (protrusions 51) toward the groove bottom surface 46.

Also, the recessed groove 23C has a pair of side walls 53 extending in a vertical direction (Z direction) from the groove bottom surface 46 to be parallel to each other. That is, the fourth inclined surfaces 52 are formed between upper ends 54 of the pair of side walls 53 and lower ends (upper ends 54 described above) of the third inclined surfaces 50.

Also, a distance between the protrusions 51, which correspond to connection locations between the third inclined surfaces 50 and the fourth inclined surfaces 52, is the minimum groove width Lw. According to the shape of the recessed groove 23C, the fastener elements 21A, 21B are guided into the recessed groove 23C along the third inclined surfaces 50 and then pass between the protrusions 51 with a lower resistance. Further, the fastener elements 21A, 21B, which have passed between the protrusions 51, are received in a region of the recessed groove 23C, which is located more toward the groove bottom surface 46 than are the protrusions 51. Since a depth position of the protrusions 51 in the recessed groove 23C can be appropriately changed depending on design, the protrusions 51 can fix the fastener elements 21A, 21B at a position, where the upper legs 33 thereof abut against the groove bottom surface 46 and also parts of the turn portions 31 (see FIG. 3) thereof, which are located toward the lower legs 35, abut against the protrusions 51. Thus, it is possible to securely support the fastener elements 21A, 21B in position in the recessed groove 23C and thus to more stably mount the cover members 11A, 11B on the base 13.

Meanwhile, in the cases of the recessed groove 23B shown in FIG. 9C and the recessed groove 23C shown in FIG. 9D, a width dimension (maximum groove width dimension) of the groove bottom surfaces 45, 46 is set to be 1.6 or more times and 2.5 or less times the maximum width La of one fastener element 21A (or 21B). By setting the maximum groove width dimension to such a range, the fastener elements can be well locked in the recessed groove 23B, 23C without being inadvertently removed therefrom.

<Mode of Attaching Fastener Elements to Cover Member>

Figure 10A:
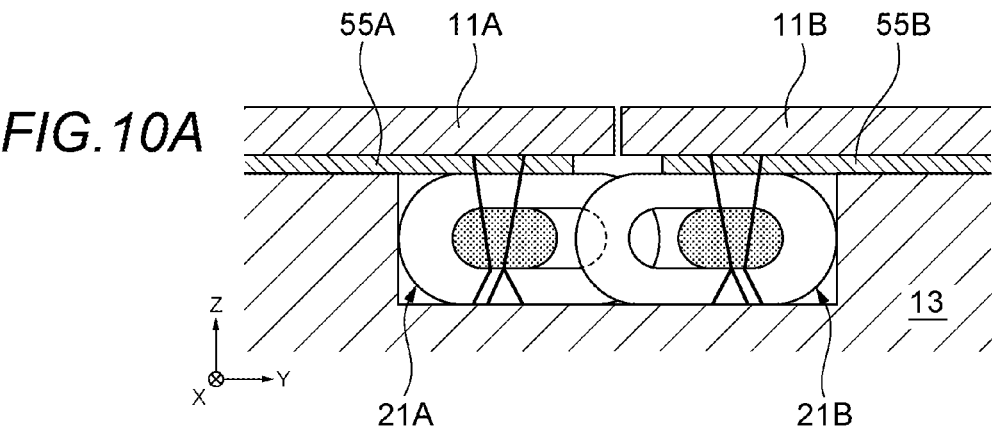
FIGS. 10A to 10C are sectional views showing modes of attaching the fastener elements to the cover member.
Figure 10B:
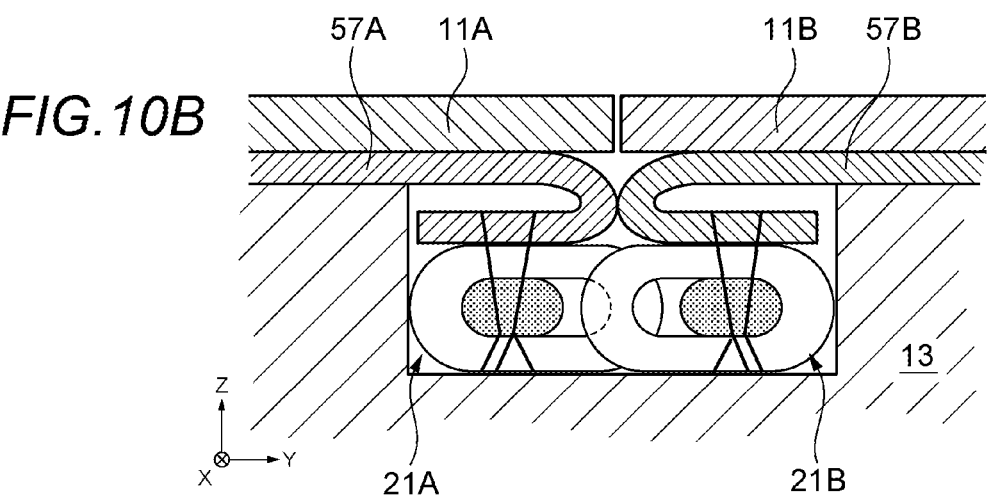
Figure 10C:
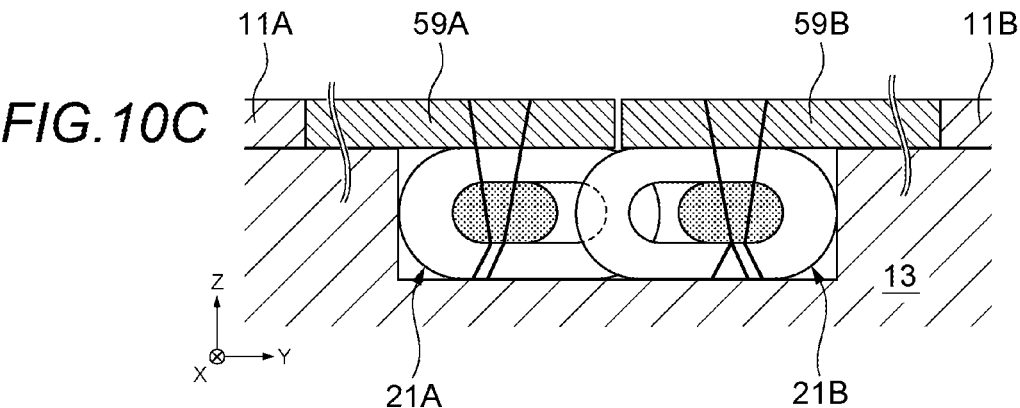

FIGS. 10A to 10C are sectional view showing modes of attaching the fastener elements 21A, 21B to the cover members 11A, 11B.

Instead of being attached to one end portion of each of the cover members 11A, 11B as shown in FIG. 3, the fastener elements 21A, 21B may be attached to the cover members 11A, 11B according to modes shown in FIGS. 10A to 10C.

FIG. 10A shows a mode in which fastener elements 21A, 21B are respectively attached to back surfaces of band-shaped fastener tapes 55A, 55B. The fastener tapes 55A, 55B, which are respectively provided with the fastener elements 21A, 21B, are respectively attached by bonding, sewing or other fixing means, in a state where front surfaces thereof overlap with back surfaces of the cover members 11A, 11B. In this case, since fasteners which are commercially available can be employed, processing is simplified and also a joining strength of each of the fastener elements 21A, 21B to the respective cover members 11A, 11B can be enhanced.

FIG. 10B shows a mode in which fastener elements 21A, 21B are respectively attached to fastener tapes 57A, 57B bent in a U-shape and thus folded back and also the fastener tapes 57A, 57B are respectively attached to the cover members 11A, 11B. The fastener tapes 57A, 57B are fastener tapes for CONCEAL® type fasteners. Therefore, the fastener elements 21A, 21B are not visible from an outer surface of the fastener tapes 57A, 57B opposite to a side thereof, on which the fastener elements 21A, 21B are attached.

In FIG. 10C, fastener elements 21A, 21B are attached to decorative tapes 59A, 59B made of the same material as that of the cover members 11A, 11B or having properties, such as texture, color and pattern, close to those of the cover members 11A, 11B. The decorative tapes 59A, 59B have the same or substantially the same thickness as that of the cover members 11A, 11B and are respectively attached to end portions of the cover members 11A, 11B. According to this configuration, the fastener elements 21A, 21B are respectively attached to the cover members 11A, 11B via the decorative tapes 59A, 59B. Accordingly, no gap is created between the cover members 11A, 11B and the base 13, thereby preventing a poor exterior appearance due to sagging of the cover members 11A, 11B and also reducing a foreign matter feeling when pressed from the outside.

<Application Example of Cover Attachment Structure to Steering Wheel>

Next, an actual application example of the cover attachment structure 100 as described above will be described. First, an example in which the cover attachment structure is applied to a wheel cover to be attached on a steering wheel for automobiles and the like is shown.

Figure 11:
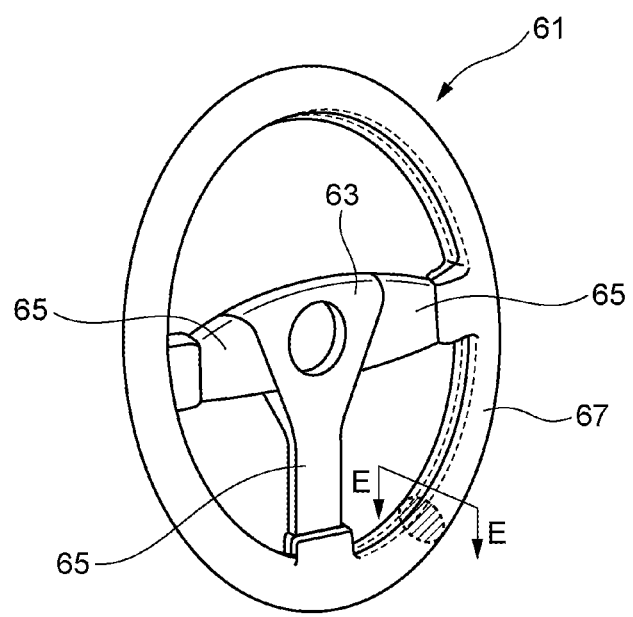
FIG. 11 is a schematic exterior perspective view of a steering wheel to which the configuration of the cover attachment structure is applied.

FIG. 11 is a schematic exterior perspective view of a steering wheel to which the configuration of the cover attachment structure is applied.

The steering wheel 61 has a boss portion 63, spoke portions 65 extending radially from the boss portion 63 and a ring portion 67 connected to radially outer sides of the spoke portions 65.

Figure 12:
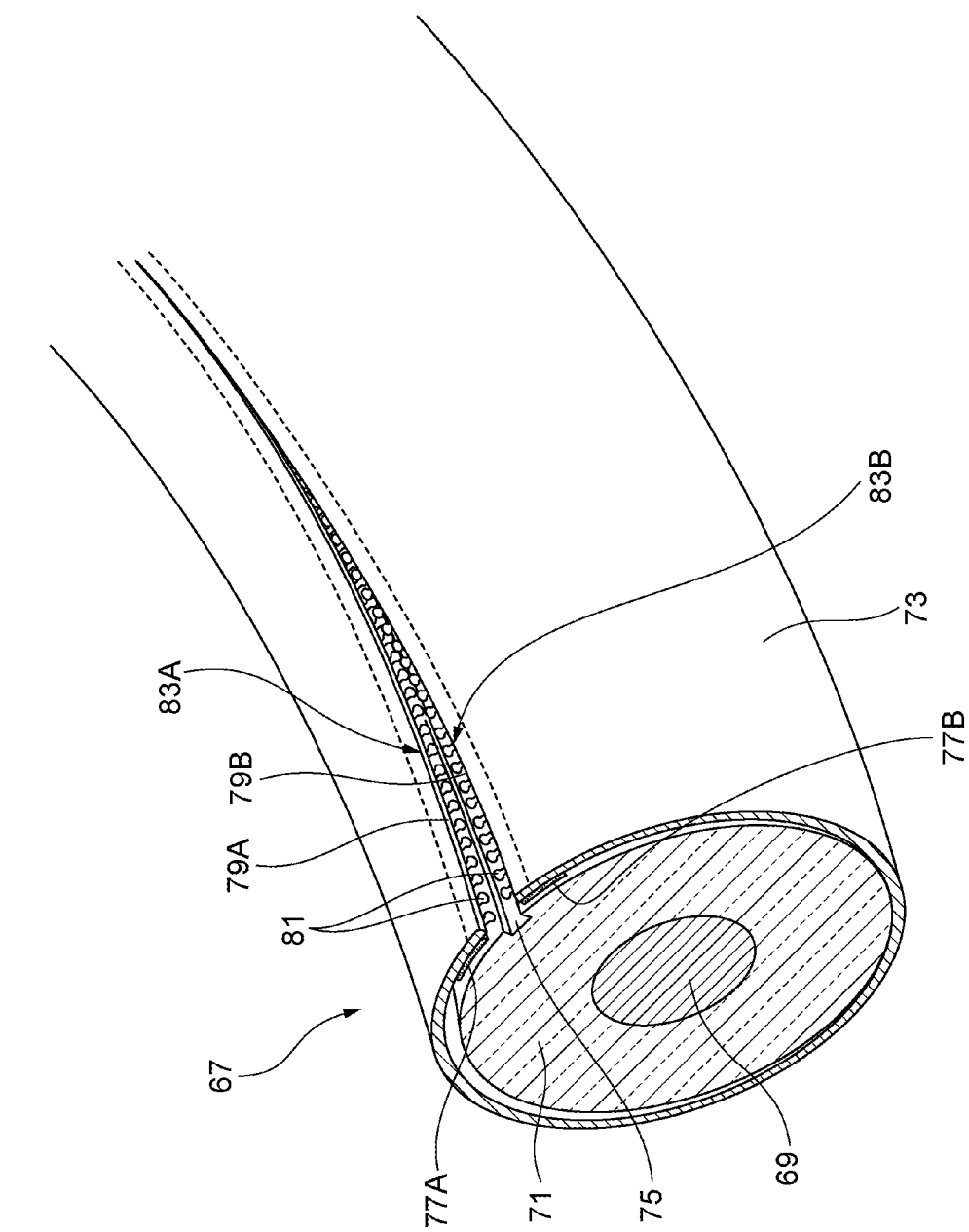
FIG. 12 is a partially exploded perspective view of a ring portion, including a section taken along a line E-E in FIG. 11.

FIG. 12 is a partially exploded perspective view of the ring portion, including a section taken along a line E-E in FIG. 11. The ring portion 67 has a core material 69 made of steel, a circular annular wheel main body 71 covering the outside of the core material 69 and made of synthetic resin, such as urethane, and a cover member 73, which is a sheet-shaped steering cover for covering the outside of the wheel.

A recessed groove 75 is formed in an inner circumferential portion of the circular annular wheel main body 71, which is a base, along a circumferential direction thereof. Fastener tapes 77A, 77B are respectively attached to a pair of opposing end portions 79A, 79B of the cover member 73. The fastener tape 77B has a first element row 83A having a plurality of fastener elements 81 arranged along a length direction thereof, and the fastener tape 77B has a second element row 83B having a plurality of fastener elements 81 arranged along a length direction thereof. The fastener tapes 77A, 77B are attached to an inner surface of the cover member 73 in such a manner that the plurality of fastener elements 81 of the first element row 83A and the second element row 83B are linearly arranged along the end portions 79A, 79B of the cover member 73.

Then, the cover member 73 is wound around the wheel main body 71 in such a manner that the first element row 83A provided on one end portion 79A and the second element row 83B provided on the other end portion 79B are arranged along the recessed groove 75 of the wheel main body 71. Thus, the cover member 73 are arranged to encircle the outer circumference of the wheel main body 71.

According to the steering wheel 61 of the above configuration, the fastener elements 81 are received in the recessed groove 75 by winding the cover member 73 around the wheel main body 71 and then inserting the fastener elements 81 of the first element row 83A and the second element row 83B of the pair of end portions 79A, 79B into the recessed groove 75. Shapes of the recessed groove 75 and the fastener elements have the dimensional relationship as described above. Therefore, if the fastener elements 81 are inserted in the recessed groove 75 as shown in FIG. 2, engaging head portions 29 thereof engage with each other. The fastener elements in such an engaged state are locked in the recessed groove 75, and thus the cover member 73 are fixed to the wheel main body 71.

Also, since the fastener elements 81 don't involve using a slider which is employed in typical slide fasteners, no gap which is intended to allow the slider to be inserted therethrough is provided between side walls defining the recessed groove 75 and the fastener elements 81 received in the recessed groove. Therefore, even if the cover member 73 is gripped, the cover member 73 is not recessed inward or displaced laterally at a location of the recessed groove 75. Thus, wrinkles or slackness doesn't occur in the cover member 73. In addition, since end portions of the cover member 73 are fixed in the recessed groove 75 while imparting a tensile force to a cover main body thereof, a poor exterior appearance can be eliminated even if the cover main body is closely attached on the surface of the wheel main body 71.

Further, the pair of end portions 79A, 79B of the cover member 73 butts against each other, so that a cover surface thereof becomes flush with itself. Thus, it is also possible to make a seam of the cover member 73 unnoticeable, thereby eliminating a poor exterior appearance. Further, since no projection occurs in the cover surface, there is little foreign matter feeling when touched by hand.

Also, the cover member 73 can be removed from the wheel main body 71 without damaging the fastener elements 81 or the recessed groove 75, by pulling the fastener elements 81 out of the recessed groove 75 while disengaging the engaging head portions from each other. Thus, the cover member 73 can be easily replaced.

Further, even if the first element row 83A and the second element row 83B provided on the cover member 73 are not provided with a top stop or bottom stop, which corresponds to an open stop of a fastener, the fastener elements 81 are sandwiched between a pair of opposing groove wall surfaces of the recessed groove 75. As a result, there is no risk that the element rows 83A, 83B are inadvertently opened. Thus, an opening and closing mechanism can be simplified.

Meanwhile, for connection portions of the cover member 73 to the spoke portions 65, the cover attachment structure of the above configuration can be employed, but conventionally well-known suitable joining techniques, such as sewing by a fixing thread or bonding using an adhesive, may be employed.

Figure 13:
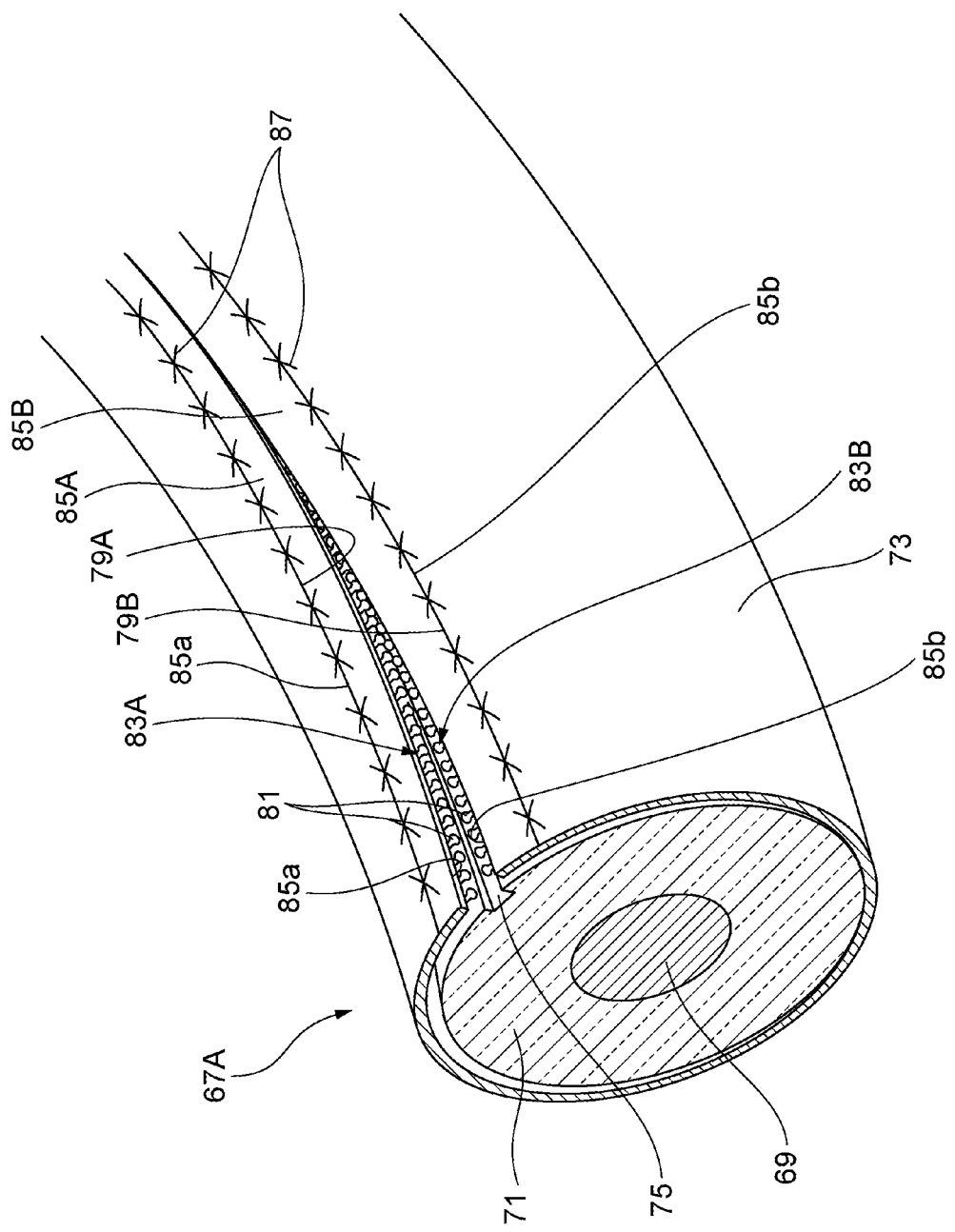
FIG. 13 is a partially exploded perspective view showing another configuration of the ring portion, including a section taken along a line E-E in FIG. 11.

FIG. 13 is a partially exploded perspective view showing another configuration of the ring portion, including a section taken along a line E-E in FIG. 11. Herein, the same members or parts as those of FIG. 12 are designated by the same reference numerals and thus the descriptions thereof will be omitted or simplified.

A ring portion 67A according to the present configuration is provided with a cover member 73 for covering an outer circumference of a wheel main body 71. Like the cover members 11A, 11B and the decorative tapes 59A, 59B shown in FIG. 10C, one end portion 85*a*, 85*b* of each of decorative tapes 85A, 85B made of the same material as that of the cover member 73 are respectively attached to end portions 79A, 79B of the cover member 73 in such a manner that end surfaces thereof butt against each other.

In the shown example, the decorative tapes 85A, 85B are sewn to the end portions 79A, 79*b* of the cover member 73 with stitches 87. Instead of providing the stitches 87, joining the cover member 73 with the decorative tapes 85A, 85B may be performed by other techniques, such as bonding by an adhesive or welding. According to this configuration, since there is no fastener tape, the cover member 73 and the wheel main body 71 can be brought into close contact with each other without a step, thereby obtaining a surface smoothly finished without projections.

<Attachment of Cover Member to Cover Attachment Structure Using Jig>

Figure 14:
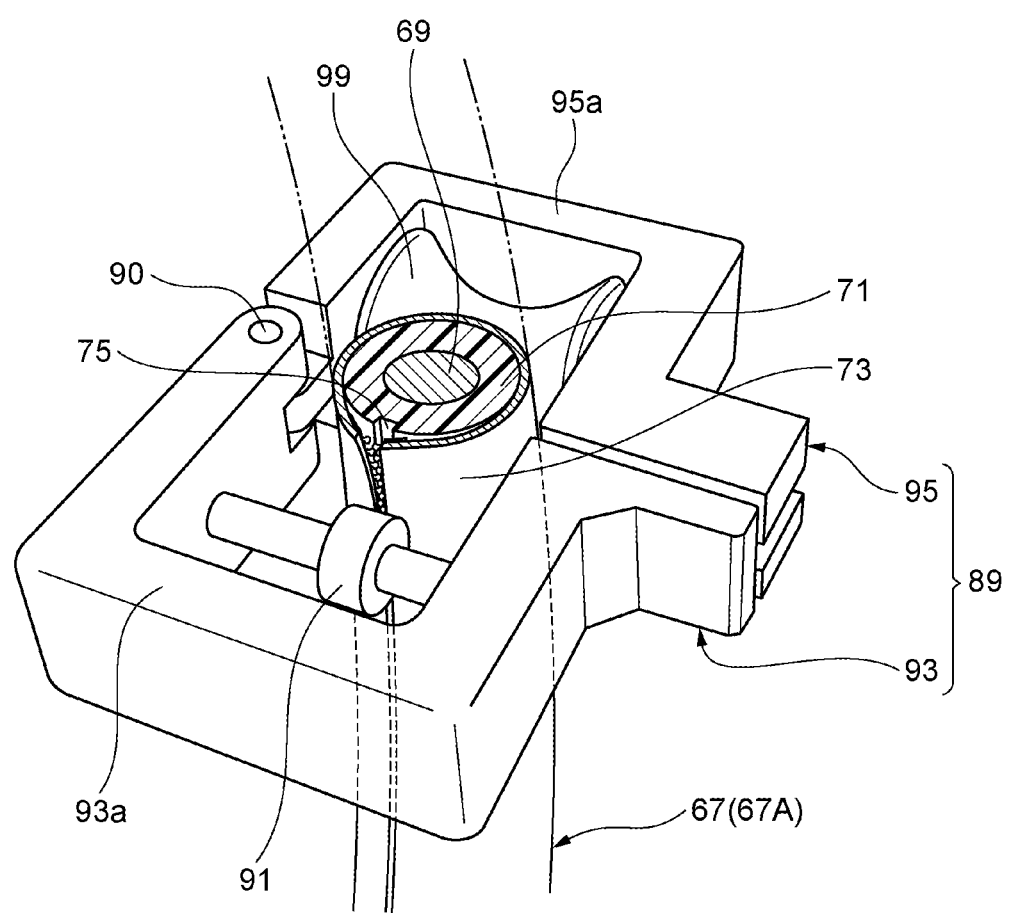
FIG. 14 is a diagram showing how the cover member is attached to the ring portion of the steering wheel as described above using a jig.

FIG. 14 is a diagram showing how the cover member 73 is attached to the ring portion 67 of the steering wheel 61 as described above using a jig.

The jig 89 has a pair of frames 93, 95 each including a U-shaped portion. The pair of frames 93, 95 are connected to each other by a support shaft 90 provided on one end side of the U-shaped portions 93*a*, 95*a*, so that the other end side of the U-shaped portions 93*a*, 95*a* is opened and closed by rotation operation thereof about the support shaft 90. In the closed state, the frames 93, 95 define a rectangular annular region. In a state where the ring portion 67 is sandwiched in the annular region, the other end side of the U-shaped portions 93*a*, 95*a* is closed by a fastening member (not shown), such as a bolt.

In the U-shaped portion 93*a* of the frame 93 defining the annular region, a pressing roller 91, which is configured to roll while pressing the ring portion 67, is rotatably supported to face the recessed groove 75 of the ring portion 67. In the U-shaped portion 95*a* of the frame 95, a backing roller 99 is rotatably supported at a location opposing the pressing roller 91 sandwiching the ring portion 67. The jig 89 is configured such that when the U-shaped portions 93*a*, 95*a* of the frames 93, 95 are closed, the ring portion 67 is radially pressed by the pressing roller 91 and the backing roller 99.

When the cover member 73 is attached to the ring portion 67 using the jig 89 of the above configuration, a part of fastener elements 81 of the first element row 83A and the second element row 83B provided on the cover member 73 shown in FIG. 12 is first inserted into one part, in a length direction, of the recessed groove 75 formed in the wheel main body 71 of the ring portion 67, thereby causing the engaging head portions of the fastener elements 81 to engage with each other. Thus, the part of the fastener elements 81, of which engaging head portion 29 have engaged with each other, is received in the recessed groove 75.

Subsequently, the pressing roller 91 is arranged just above the part of the fastener elements 81, of which engaging head portion have engaged with each other and which has been received in the recessed groove 75, and then the frame 95 is closed. Then, in a state where the pressing roller 91 is arranged at a location just above the engaged fastener elements 81 as a starting point, the cover member 73 is pressed toward the recessed groove 75. Then, the pressing roller 91 and the ring portion 67 are relatively moved with respect to each other along an extending direction of the recessed groove 75 while maintaining such a pressed state. Thus, the pressing roller 91 rolls while pressing the remaining unengaged fastener elements 81 toward the recessed groove 75, thereby causing the engaging head portions of the fastener elements 81 to engage with each other and then to be received in the recessed groove 75.

The relative movement between the jig 89 and the ring portion 67 may be performed by moving the jig 89 relative to the ring portion 67 or by moving the ring portion 67 relative to the jig 89. Also, a part of fastener elements 81 of the first element row 83A and a part of fastener elements 81 of the second element row 83B may be inserted into the recessed groove 75, thereby causing engaging head portions thereof to engage with each other. Also engaging head portions of a part of the fastener elements 81 may be previously engaged with each other and then inserted into the recessed groove 75.

In the case where the engaging head portions of the fastener elements 81 are engaged with each other by an operation of inserting the fastener elements 81 into the recessed groove 75, an attaching process can be simplified. On the other hand, in the case where the engaging head portions are inserted into the recessed groove 75 after being engaged with each other, it is easy to precisely position the fastener elements 81, which are to be engaged with each other.

The above configuration of the jig 89 is only one example, and thus the present invention is not limited thereto. For example, a roller, a spatula or the like may be pressed against the cover member above the recessed groove 75 to push the fastener elements 81 into the recessed groove 75.

<Other Applications of Cover Attachment Structure>

Next, other applications of the cover attachment structure will be described.

The cover attachment structure as described above is not limited to the steering wheel, but may be applied to any other structures, in which a base surface is covered with a cover member. For example, other applications can include the following instances.

(1) Seat covers to be attached to a seat or backrest of a chair.

Figure 15:
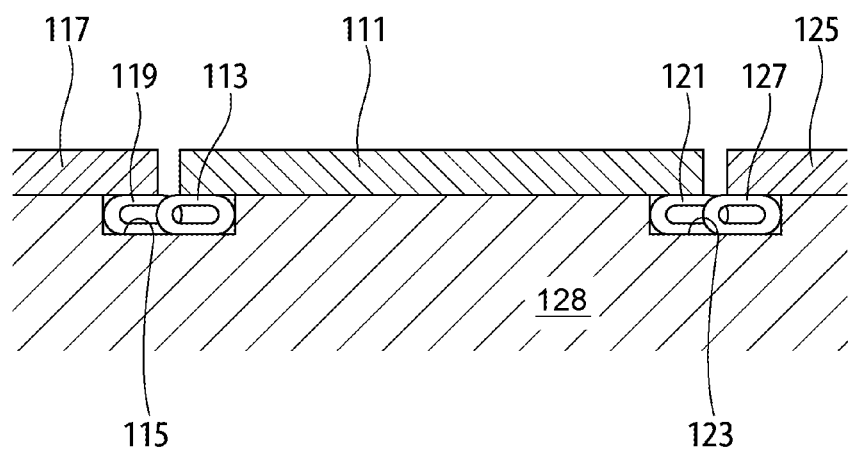
FIG. 15 is a sectional view showing another example of a mode of attaching a cover member to a base surface.

The cover attachment structure of the present configuration can be applied to end portions or the like of a cloth covering a seat or backrest of a chair, thereby making the cloth for the chair replicable. In this case, the cloth, which is a cover member, can be wound around the seat or backrest, but depending on attachment sites of the cover member, it may be preferable to use a combination of a plurality of cover members. In this case, as shown in FIG. 15, one element row 113 provided on one cover member 111 is inserted in a recessed groove 115, thereby causing engaging head portions thereof to engage with engaging head portions of an element row 119 of another cover member 117. Also, the other element row 121 is inserted in a recessed groove 123, thereby causing engaging head portions thereof to engage with engaging head portions of an element row 127 of the other cover member 125. That is, fastener elements are attached alongside edges of both ends of one cover member 111. Subsequently, fastener elements attached along a side edge of another cover member 117 are arranged to oppose fastener elements of the previous cover member 111 and are received in a specific recessed groove 115. Also, additional fastener elements attached along a side edge of the other cover member 125 are arranged to oppose additional fastener elements of the cover member 111 and are received in an additional specific recessed groove 123 provided at a location different from that of the previous recessed groove 115. Thus, one cover member 111 is fixed in the recessed grooves 115, 123 at different locations, and thus a surface of a base 128 is covered with the cover members 111, 117, 125. In other words, fastener elements of different cover members 111, 117, 125 are received in the recessed grooves 115, 123 at the same location.

(2) A roof lining, pillar linings for front pillars, center pillars and the like, linings provided on doors or armrests in an automobile.

For example, for a roof lining (cover member) of an automobile, a lining around an assist grip provided on a ceiling surface thereof is likely to be fouled due to contact with a hand. Thus, a predetermined region of a roof surface surrounding around the assist grip is constructed by the cover attachment structure of the present configuration, thereby making the lining replaceable.

Figure 16:
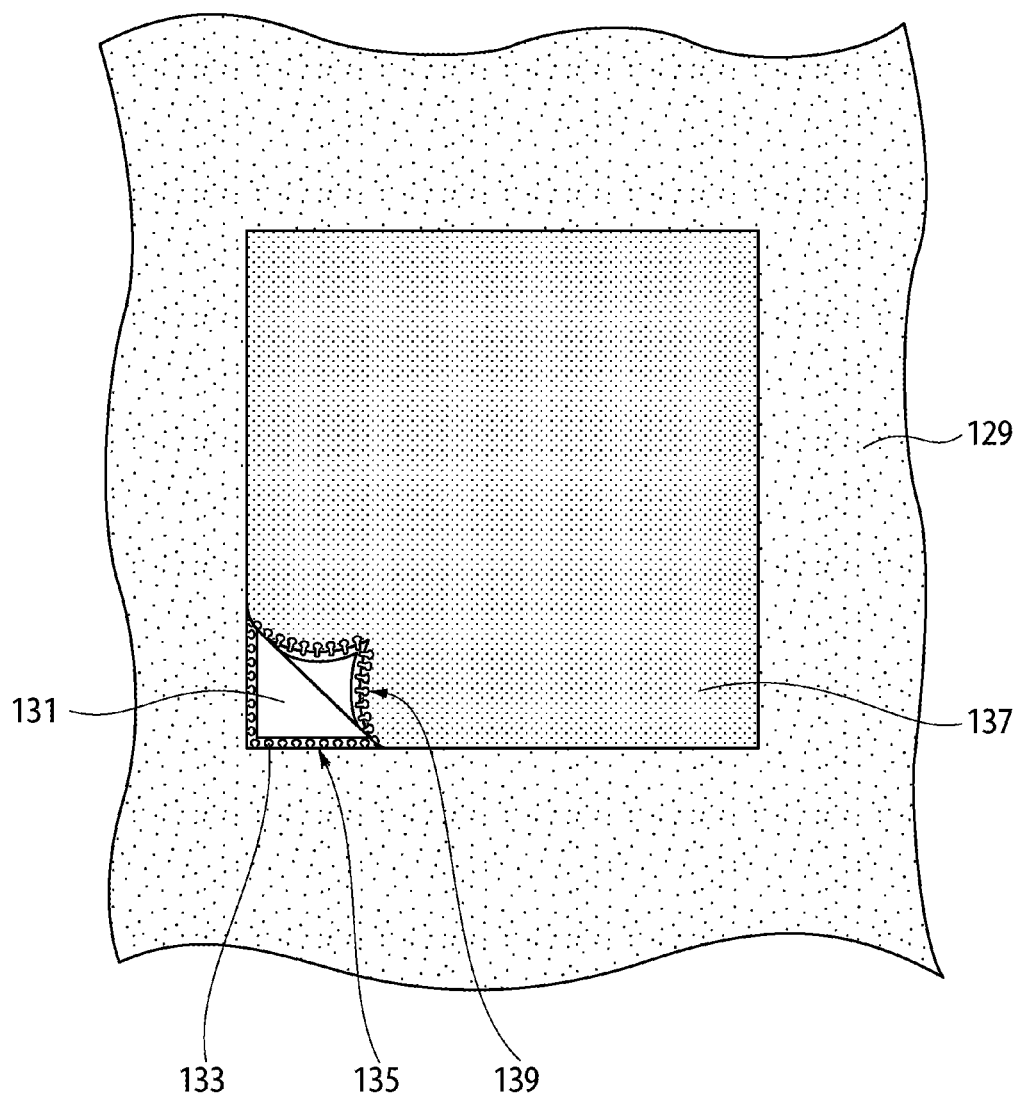
FIG. 16 is a sectional view showing further another example of a mode of attaching a cover member to a base surface.
Figure 17A:
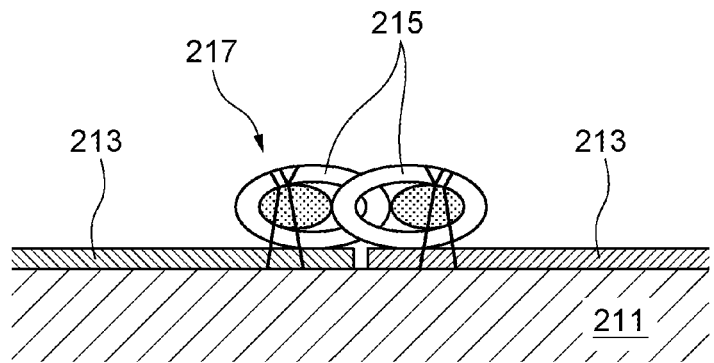
FIGS. 17A, 17B and 17C are sectional views showing exemplary configurations in which a cover member is attached to a base using a conventional fastener.
Figure 17B:
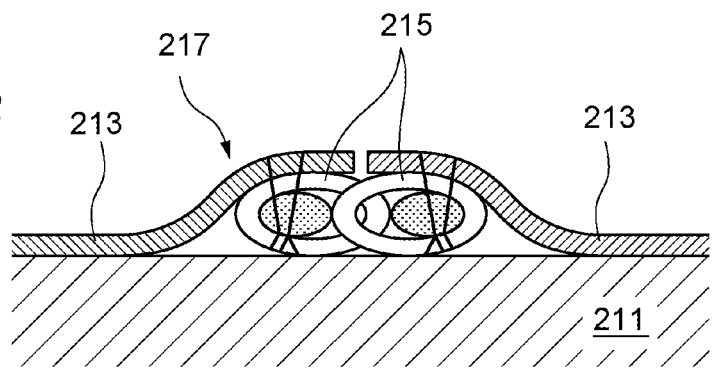
Figure 17C:
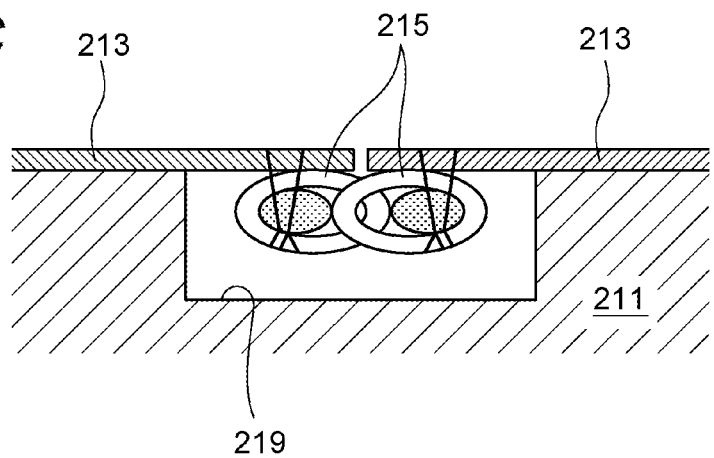

That is, as schematically shown in FIG. 16, a recessed groove 133 is formed in a part of a base 131 to be covered with a lining 129 in such a manner that the recessed groove 133 corresponds to an outer edge of a region, of which lining is configured to be replaceable. An element row 135 is provided along the recessed groove 133. The lining 129 is provided to cover a region outside the recessed groove 133 and thus a region thereof inside the recessed groove 133 is opened. Also, a lining piece 137, which is prepared separately from the lining 129 and has a shape surrounded by the annular recessed groove 133, is provided with an element row 139 on end portions thereof. The element row 139 of the lining piece 137 is inserted into the recessed groove 133, thereby causing engaging head portions thereof to engage with engaging head portions of the element row 135 of the recessed groove 133. Thus, the lining piece 137 can be replaceably attached to the opening of the lining 129. Similarly to the above, pillar linings or linings provided on doors or armrests can be also constructed to be easily replaceable.

(3) Wallpapers to be provided on wall or ceiling surfaces of a building, carpet to be laid on a floor thereof.

The cover attachment structure of the present configuration can also be applied to indoor and outdoor wall surfaces, ceiling surfaces and floor surfaces of buildings, such as houses, shops and public facilities, such as stations and hospitals. For example, a wallpaper provided on a wall surface can be replaced as a whole or in part, so that renewing in particular a site where stains is noticeable or changing the wall surface to a desired one, which is different in color, pattern, material and the like, can be freely performed. Replacement of the cover member may be ensured by making the cover member detachable like the cover members, as shown in FIGS. 15 and 16 and described above, or by partially or entirely covering a base surface with one or a plurality of cover members.

Thus, the present invention is not limited to the foregoing embodiments, and accordingly, combining features of each of the embodiments with each other or modifying or applying the features by those skilled in the art based on the description of the specification and well-known techniques is intended to be included in a plan of the present invention and to be encompassed by the scope thereof.

Although the first element row and the second element row described above are coil-shaped continuous elements, the present invention is not limited thereto and accordingly any other fastener elements, of which engaging head portions can be engaged with each other without using a slider, may be employed. For example, synthetic resin element rows, in which injection-molded type fastener elements are attached on opposing side edges of a pair of fastener tapes or cover members by injection-molding using synthetic resin, may be employed.

DESCRIPTION OF REFERENCE NUMERALS 11A, 11B Cover Member
11a Attaching Surface
13 Base
15 Fastener Member
17A, 17B One End Portion
19A First Element Row
19B Second Element Row
21A, 21B Fastener Element
23 Recessed Groove
29 Engaging Head Portion
39 Pressing Member
41 Groove Side Surface
43 Opened End Portion
45 Groove Bottom Surface
47 First Inclined Surface (Inclined Surface)
50 Third Inclined Surface (Inclined Surface)
51 Protrusion
55A, 55B, 57A, 57B Fastener Tape 59A, 59B, 85A, 85B Decorative Tape
61 Steering Wheel
71 Wheel Main Body
73 Cover Member
75 Recessed Groove
77A, 77B Fastener Tape
79A, 79B End Portion
81 Fastener Element
91 Pressing Roller
100 Cover Attachment Structure
111, 117, 125 Cover Member
113, 119, 121, 135, 139 Element Row
115, 123, 133 Recessed Groove
128, 131 Base
137 Lining Piece (Cover Member)

The invention claimed is:

1. A cover attachment structure comprising:
a sheet-shaped cover member,
a base having a surface to be covered with the cover member, and
a fastener member for attaching the cover member to the base,
wherein the fastener member comprises:
a first element row provided on one end portion of the cover member and including a plurality of fastener elements, each of the plurality of fastener elements of the first element row having an engaging head portion and arranged along an end edge of the one end portion; and
a second element row including a plurality of fastener elements, each of the plurality of fastener elements of the second element row having an engaging head portion capable of engaging with the fastener elements of the first element row,
wherein the base defines a recessed groove extending along the surface thereof,
wherein the fastener elements of each of the first element row and the second element row are received in the recessed groove and locked in the recessed groove in a state where the engaging head portions thereof engage with each other, and
wherein a minimum groove width of the recessed groove in a width direction orthogonal to a length direction of the recessed groove is 1.6 or more times and 1.9 or less times a length, in the width direction, of the fastener elements of either of the element rows received in the recessed groove so that the fastener elements are in an interference-fitted state in the recessed groove.

2. The cover attachment structure according to claim 1, wherein the recessed groove is configured such that a maximum groove width dimension thereof located more toward a bottom surface thereof than is the minimum groove width is at least 1.6 times and at most 2.5 times the length, in the width direction, of the fastener elements of either of the element rows received in the recessed groove.

3. The cover attachment structure according to claim 1, wherein the recessed groove has a groove depth of at least 0.5 times and at most 1.5 times a height of the fastener elements.

4. The cover attachment structure according to claim 1, wherein each of the fastener elements of the first element row is provided on a fastener tape, wherein the fastener tape is attached to the one end portion of the cover member.

5. The cover attachment structure according to claim 4, wherein each of the fastener elements of the second element row is provided on a fastener tape, wherein the fastener tape is attached to the one end portion of the cover member.

6. The cover attachment structure according to claim 1, wherein each of the fastener elements of the first element row is directly attached to the one end portion of the cover member.

7. The cover attachment structure according to claim 6, wherein each of the fastener elements of the second element row is directly attached to the one end portion of the cover member.

8. The cover attachment structure according to claim 1, wherein the second element row is provided on an end portion of the cover member located at a location different from that of the one end portion of the cover member on which the first element row is provided.

9. The cover attachment structure according to claim 8, wherein the cover member is arranged to encircle an outer circumference of the base, wherein the second element row is provided on the other end portion thereof opposite to the one end portion, wherein the fastener elements of each of the first element row and the second element row are locked in the recessed groove.

10. The cover attachment structure according to claim 1, wherein the cover member comprises a plurality of cover members,
wherein the base has recessed grooves formed to correspond to fastener elements of the plurality of cover members, and
wherein fastener elements of different cover members are received in the recessed grooves at the same location.

11. A cover attachment structure comprising:
a sheet-shaped cover member;
a base having a surface to be covered with the cover member; and
a fastener member for attaching the cover member to the base;
wherein the fastener member comprises:
a first element row provided on one end portion of the cover member and including a plurality of fastener elements, each of the plurality of fastener elements of the first element row having an engaging head portion and arranged along an end edge of the one end portion; and
a second element row including a plurality of fastener elements, each of the plurality of fastener elements of the second element row having an engaging head portion capable of engaging with the fastener elements of the first element row;
wherein the base defines a recessed groove extending along the surface thereof;
wherein the fastener elements of each of the first element row and the second element row are received in the recessed groove and locked in the recessed groove in a state where the engaging head portions thereof engage with each other;
wherein the recessed groove is configured such that a minimum groove width thereof in a width direction orthogonal to a length direction of the recessed groove is less than 2 times a length, in the width direction, of the fastener elements of either of the element rows received in the recessed groove; and
wherein the recessed groove is configured to have an inclined surface formed on at least one of opposing groove side surfaces, a groove width in the width direction narrowing from an opened end portion thereof toward a groove bottom surface.

12. A cover attachment structure comprising:
a sheet-shaped cover member;
a base having a surface to be covered with the cover member; and
a fastener member for attaching the cover member to the base;
wherein the fastener member comprises:
   a first element row provided on one end portion of the cover member and including a plurality of fastener elements, each of the plurality of fastener elements of the first element row having an engaging head portion and arranged along an end edge of the one end portion; and
   a second element row including a plurality of fastener elements, each of the plurality of fastener elements of the second element row having an engaging head portion capable of engaging with the fastener elements of the first element row;
wherein the base defines a recessed groove extending along the surface thereof;
wherein the fastener elements of each of the first element row and the second element row are received in the recessed groove and locked in the recessed groove in a state where the engaging head portions thereof engage with each other;
wherein the recessed groove is configured such that a minimum groove width thereof in a width direction orthogonal to a length direction of the recessed groove is less than 2 times a length, in the width direction, of the fastener elements of either of the element rows received in the recessed groove; and
wherein the recessed groove has a groove bottom surface wider than the minimum groove width.

13. The cover attachment structure according to claim 1, wherein the base is a steering wheel for an automobile, and
wherein the cover member is a steering cover for covering the outside of the steering wheel.

14. A cover attachment method for the cover attachment structure according to claim 1, the method comprising:
   a first step of causing a part of the fastener elements of the first element row and a part of the fastener elements of the second element row to be received in one part of the recessed groove in a length direction in a state in which the engaging head portions thereof are engaged with each other; and
   a second step of pressing the cover member toward the recessed groove while moving from the one part of the recessed groove in the length direction as a starting point along an extending direction of the recessed groove so that the remaining unengaged fastener elements are received in the recessed groove in a state in which engaging head portions thereof are engaged with each other, thereby locking the fastener elements of each of the first element row and the second element row in the recessed groove.

15. The cover attachment method according to claim 14, wherein in the second step, a pressing roller, rotatably supported, is moved along the extending direction of the recessed groove while being pressed toward the recessed groove from above the fastener member, and wherein also the pressing roller is rolled on the fastener member.

* * * * *